US008615986B2

(12) United States Patent
Gouriet et al.

(10) Patent No.: US 8,615,986 B2
(45) Date of Patent: Dec. 31, 2013

(54) PROCESS FOR TRANSFERRING A LIQUID USING A PUMP

(75) Inventors: Jean-Baptiste Gouriet, Genval (BE); Jean-Claude Habumuremyi, Haaltert (BE); Nicolas Duret, Nancy (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 578 days.

(21) Appl. No.: 12/812,914

(22) PCT Filed: Jan. 19, 2009

(86) PCT No.: PCT/EP2009/000300
§ 371 (c)(1),
(2), (4) Date: Feb. 18, 2011

(87) PCT Pub. No.: WO2009/090101
PCT Pub. Date: Jul. 23, 2009

(65) Prior Publication Data
US 2011/0139255 A1    Jun. 16, 2011

(30) Foreign Application Priority Data
Jan. 17, 2008  (FR) ...................... 08 50296

(51) Int. Cl.
*F01N 3/20*  (2006.01)
(52) U.S. Cl.
USPC .................. 60/286; 60/274; 60/295; 60/301; 137/563; 137/571; 137/574; 137/576

(58) Field of Classification Search
USPC ............ 60/274, 286, 295, 301; 137/563, 571, 137/574, 576; 417/32, 36
See application file for complete search history.

(56) References Cited

U.S. PATENT DOCUMENTS

| 3,789,865 A | * | 2/1974 | Borman ................. 137/122 |
| 4,288,086 A | * | 9/1981 | Oban et al. ............. 280/834 |
| 5,417,239 A | * | 5/1995 | Ford .................... 137/571 |
| 5,884,475 A |   | 3/1999 | Hofmann et al. |

(Continued)

FOREIGN PATENT DOCUMENTS

| EP | 0928884 A2 | 7/1999 |
| EP | 1388648 A1 | 2/2004 |

(Continued)

OTHER PUBLICATIONS

U.S. Appl. No. 12/513,780, filed May 6, 2009, Philippe Georis et al.

(Continued)

*Primary Examiner* — Thomas Denion
*Assistant Examiner* — Jorge Leon, Jr.
(74) *Attorney, Agent, or Firm* — Oblon, Spivak, McClelland, Maier & Neustadt, L.L.P.

(57) ABSTRACT

Process for transferring a liquid from a passive tank (1) for storing the liquid to an active tank (2) using a pump intended for pumping the liquid held in the passive tank (1) and transferring it to the active tank (2), according to which the pump is commanded so as to transfer liquid from the passive tank (1) to the active tank (2) when said active tank (2) has a liquid level below a set point level Lsp and when the passive tank (1) contains liquid at a temperature above the freezing point of the liquid.

8 Claims, 4 Drawing Sheets

(56) References Cited

U.S. PATENT DOCUMENTS

| | | | |
|---|---|---|---|
| 5,913,294 A * | 6/1999 | Takahashi et al. | 123/198 DB |
| 2001/0035215 A1 * | 11/2001 | Tipton et al. | 137/571 |
| 2002/0148510 A1 * | 10/2002 | Viebahn et al. | 137/574 |
| 2009/0078692 A1 | 3/2009 | Starck | |
| 2009/0084095 A1 * | 4/2009 | Dalton | 60/301 |
| 2009/0311147 A1 | 12/2009 | Georis et al. | |
| 2010/0043409 A1 | 2/2010 | Naydenov et al. | |

FOREIGN PATENT DOCUMENTS

| | | |
|---|---|---|
| FR | 2911643 A1 | 7/2008 |
| FR | 2916188 A1 | 11/2008 |
| WO | WO 2007017080 A1 | 2/2007 |
| WO | WO 2008/058977 A1 | 5/2008 |
| WO | WO 2008/138960 A1 | 11/2008 |
| WO | WO 2009/037340 A1 | 3/2009 |

OTHER PUBLICATIONS

U.S. Appl. No. 12/677,362, filed Mar. 11, 2010, Joel Op De Beeck et al.

[Unknown Author], DIN 70070 (Aug. 2003-Aug. 2005) "Standard : Diesel Engines NOx•Reduction Agent AUS 32 Quality Requirements"; 26 pgs including machine translation in English.

* cited by examiner

PROCESS FOR TRANSFERRING A LIQUID USING A PUMP

CROSS-REFERENCE TO RELATED APPLICATIONS

This application is a U.S. national stage application under 35 U.S.C. §371 of International Application No. PCT/EP2009/000300 filed Jan. 19, 2008, which claims priority to French Patent Application No. 08.50296 filed Jan. 17, 2008, this application being incorporated herein by reference in its entirety for all purposes.

TECHNICAL FIELD OF THE INVENTION

The present application relates to a process for transferring a liquid from a first tank to a second tank using a pump. It relates, in particular, to a process for transferring aqueous solutions of urea or of another ammonia precursor susceptible of freezing at ambient temperatures depending on the local weather conditions.

BACKGROUND OF THE INVENTION

With the Euro IV standard on exhaust emissions from heavy goods vehicles coming into effect in 2005, devices for pollution control of NO (or nitrogen oxides) had to be put in place.

The system used by most heavy goods vehicle manufacturers for reducing $NO_x$ emissions to the required value generally consists in carrying out a selective catalytic reaction with reducing agents such as urea ("Urea SCR" or selective catalytic reduction using ammonia generated in situ in the exhaust gases by decomposition of urea).

In order to do this, it is necessary to equip the vehicles with a tank containing a urea solution and also with a device for metering the amount of urea to be injected into the exhaust line. Given that the aqueous urea solution generally used for this purpose (eutectic 32.5 wt % urea solution) freezes at minus 11° C., it is necessary to provide a heating device to liquefy the solution in order to be able to inject it into the exhaust line in the event of starting in freezing conditions.

For the purpose of increasing the autonomy of the vehicles, and considering the encumbrance/structure of the vehicles, it is sometimes desired to have at least two tanks for storing the urea solution. For the purpose of preventing the problems of freezing, of limiting the costs of the system and also the power consumed, it is moreover known to heat only one of the two tanks. Such a heating is required because the car manufacturers generally require the anti-polluting system to be effective during at least a given amount of km and/or time if possible also during freezing conditions. Such a specification is or will become more and more applied because of the more and more severe environmental standards. Such a specification implies a minimum volume of liquid to be available considering the consumption of said liquid by the system.

Urea systems with two tanks have already been proposed. Thus, U.S. Pat. No. 5,884,475 describes the use of two urea tanks in series: a main (storage) tank and a secondary (low volume) tank (also referred to as an active tank) which is heated and which is used for starting in the case of freezing. A main urea feed pump sucks up the urea solution into the secondary tank. Patent US '475 does not describe how the situations are managed in which the secondary tank cannot be supplied with urea solution from the storage tank because the latter no longer contains enough urea or because the urea contained in the storage tank is frozen and cannot be transferred from one tank to the other. If the secondary tank cannot be supplied with urea solution so as to contain a sufficient quantity of solution to be injected into the exhaust line, there is a risk of the main pump operating when empty (which could damage it) and of the system not being supplied with additive. Besides, in this document, the main storage tank is heated (either because the entire system is heated (embodiment of FIG. 3) or because said tank is provided with a heater for instance consisting in a heat exchanger circulating engine coolant (embodiment of FIG. 4)), which adds an extra cost to the system.

Moreover, processes are also known from the prior art for transferring urea from a storage tank to a secondary tank using a transfer pump that is kept running throughout the process regardless of the operating conditions, in particular when the urea freezes or when the storage tank does not contain urea for supplying the secondary tank. Such processes may damage the transfer pump.

SUMMARY OF THE INVENTION

The present invention aims to solve these problems by providing a process for transferring the solution from the storage tank to the secondary tank using a transfer pump that is only activated when required and when the operating conditions (in particular the temperature outside the tanks and eventually their thermal history) make it possible to cope with the problem of freezing, even by heating only one of these tanks, and with the problem of insufficient availability of urea in the storage tank for supplying the secondary tank.

For this purpose, the present application relates to a process for transferring a liquid from a passive tank (1) for storing the liquid to an active tank (2) using a pump intended for pumping the liquid held in the passive tank (1) and transferring it to the active tank (2), according to which the pump is commanded so as to transfer liquid from the passive tank (1) to the active tank (2) when said active tank (2) has a liquid level below a set point level Lsp and when the passive tank (1) contains liquid at a temperature above the freezing point of the liquid.

Such a process allows liquid to be withdrawn from the passive tank (1) only when it is required (i.e. only when the level in tank (2) is below a set point level), when the passive tank (1) is not empty and when the liquid that it contains is not frozen. Moreover, with such a process, it is sufficient to equip tank (2) with a heating device in order to have an effective process in case the liquid in tank (2) freezes. Hence, the presence of a heater can be avoided in the passive tank (1).

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
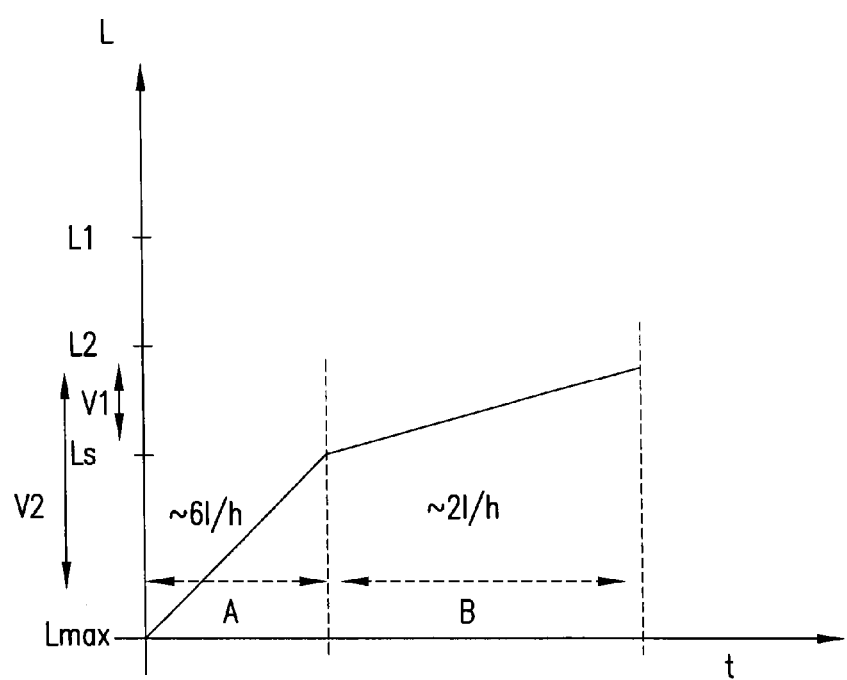
FIG. 1 represents an exemplary curve of a liquid level L in the active tank (2) as a function of the time when there is an overflow of liquid from active tank (2) to passive tank (1) and when there is no transfer of liquid from passive tank (1) to active tank (2)

According to a preferred embodiment of the present invention, liquid is transferred from passive tank (1) to active tank (2) until a target level is reached. This level generally is at least the full level of said tank, calculated based on its geometry and the car manufacturer specification.

The set point and target levels may be the same but preferably, they are significantly different so that the transfer pump is not continuously switched on and off. Hence, preferably, Lt>Lsp.

In some embodiments, depending generally on the car geometry, the passive tank may be fixed under the car body and the active tank (2) is located above the passive tank (1) so that the latter can be filled by overflow of the former. Such a geometry generally allows short filling times, which is advantageous especially since refilling operations generally take place during service/maintenance of the car.

In these embodiments, it is advantageous for the transfer pump to be able to overfill (i.e. to fill at a level where overflow will occur) the active tank (2) in order to take advantage of most of the active volume of said tank (especially when it is heated). In such embodiments, which will be described in detail later in the specification, the above mentioned target level may be an overflow level or even: the maximum overflow level i.e. the maximum level at which tank (2) can be filled considering its geometry i.e. namely: the location of the overflow passage in said tank.

Generally, in the process of the invention, the system starts by measuring the level inside active tank (2). If this level is not below the set point level, the transfer pump is not activated and the SCR system starts using the liquid present in tank (2). If the level in tank (2) is below the set point level, then the SCR system checks if the transfer conditions are met (i.e. if tank (1) contains liquid at a temperature above the freezing point of said liquid) before activating the transfer pump.

According to the invention, tank (1) is preferably not equipped with a temperature probe whereas tank (2) is equipped with a temperature probe. To obtain a value of the temperature in tank (1), the temperature Text outside the two tanks (1) and (2) is measured using a temperature probe, which temperature Text is taken as an estimation of the temperature in tank (1).

According to one preferred embodiment of the invention, the process comprises the following steps:
- a temperature Text outside of the two tanks (1) (2) is measured and it is compared to a set point temperature T1;
- the liquid level L in the active tank (2) is compared to a set point level Lsp;
- if Text≥T1 and L<Lsp, the transfer pump is activated so as to pump liquid in tank (1) and transfer it into the active tank (2) until a target level Lt is reached, where Lt>=Lsp.

In this embodiment, set point temperature T1 corresponds to the freezing point of the liquid contained in tanks (1) and (2). Hence, the process according to this embodiment fails to activate liquid transfer in transient conditions where this transfer would be possible i.e. for instance when the car passes from mid-season or summer conditions to winter conditions or vice versa, and when the liquid is not yet or no longer frozen.

Hence, according to a more preferred embodiment of the invention, Text is compared to its former values (i.e. the thermal history of the system) stored in a memory of a processor and said processor estimates if the liquid in tank (1) is really frozen based on these data and on a time constant that corresponds to the liquid in tank (1) changing from the solid state to the liquid state or vice versa. This more preferred embodiment thus comprises the following steps:
- a temperature Text outside of the two tanks (1)(2) is measured and a processor uses this measurement, the thermal history of the system and a time constant that corresponds to the liquid in tank (1) changing from the solid state to the liquid state or vice versa, to check whether or not the liquid in tank (1) is frozen;
- the liquid level L in the active tank (2) is compared to a set point level Lsp;
- if the liquid in tank (1) is not frozen and L<Lsp, the transfer pump is activated so as to pump liquid in tank (1) and transfer it into the active tank (2) until a target level Lt is reached, where Lt>=Lsp, and the transfer pump is stopped;
- if the liquid in tank (1) is frozen or if L>=Lsp, the transfer pump is not activated.

According to one preferred variant of these two embodiments:
- the liquid level L is measured using a level sensor equipped with a float and positioned in the active tank (2), if the float is not blocked; it is preferably combined with the consumption of the liquid in the purpose of having another level information (this is important in the diagnostic of the level sensor for example);
- the liquid level L is deduced from a value of the liquid level L stored in a memory and from the consumption of liquid in the active tank (2) if the float is blocked.

According to this variant, when the liquid in tank (2) is not in a frozen state, the level L in tank (2) is measured using a level sensor equipped with a float. This value of L may be stored in a memory. When the liquid is in a frozen state, the float may be blocked by the frozen liquid and is consequently no longer able to provide a value of the level L. This is why, in this case, the level L is deduced from a value of the level L stored in the memory and from the consumption of liquid in the active tank (2).

Particularly, the level sensor in tank (2) provides an indication of the level L in tank (2) in a discrete manner. The sensor may be, for example, of the float type and provides three indications of the level L as a function of the relative position of the float with respect to two set point levels L1 and L2, where L1<L2. In this case, when the level L is greater than or equal to L2 the sensor indicates a "high level", when the level L is less than L2 and greater than or equal to L1 the sensor indicates an "intermediate level" and when the level L is less than L1 the sensor indicates a "low level". Generally, L2 is <=Lt as defined above. This reasoning can of course be generalized to a gauge having more set point levels.

Also preferably, the time during which the pump transfers liquid is also measured and the pump is stopped if this time is greater than a time constant TD and the liquid level L has not reached the target level Lt, i.e. when L<Lt. In this way, the pump is prevented from operating for too long when the tank (1) is empty since the pump may then operate when empty and risks being damaged. This situation can happen also when the pump is broken.

In general, tanks (1) and (2) have different capacities, tank (1) for liquid storage preferably having a capacity Lmax greater than that of tank (2). Tank (1) may, for example, have a capacity Lmax1 of around 20 liters and tank (2) a capacity Lmax2 of around 7 liters.

As explained above, tanks (1) and (2) are generally not positioned at the same level, tank (2) preferably being located at a higher level compared to the level of tank (1). According to a preferred embodiment of the invention, the two tanks communicate with each other via an overflow device when the level L in tank (2) is above a given level and/or when the liquid in tank (2) is subjected to a wave movement, also known as "slosh". Slosh may be created by movement of tank (2), for example when tank (2) is mounted on a vehicle and when the vehicle is driving and/or undergoes a change of direction movement and/or when it is moving over a sloping road.

More preferably, during the liquid transfer from a tank (1) located below a tank (2) and filled by overflow of said tank (2), when the level L in tank (2) is greater than or equal to L2, the pump is commanded to transfer a quantity of liquid equivalent to an increment ΔLof of the liquid level L that to an overflow volume in tank (2). Hence, in this embodiment, Lt=L2+ΔLof. In this way, the process according to the invention makes it possible to reach a liquid level (Lt=L2+ΔLof) in tank (2) so that in case of overflow of liquid equivalent to the increment ΔLof, the level L in tank (2) is at least still equal to L2. This also makes it possible to prevent the pump from operating too frequently, each time that an even partial overflow of liquid from tank (2) to tank (1) takes place.

More preferably still, when the level L in tank (2) is greater than or equal to L2, the time for which the pump transfers liquid is measured and the pump is stopped if this time is greater than a time constant TO (TO has, for example, a value of around 2 minutes), and the liquid level L<(Lt=L2+ΔLof). In this way, the pump is prevented from operating for too long when the tank (1) is empty and when the liquid level in tank (2) has not reached the overflow set point level, i.e. L<L2+ΔLof, or when the pump is broken.

The present invention may be applied to any internal combustion engine. It is advantageously applied to diesel engines, and in particular to the diesel engines of heavy goods vehicles.

As explained previously, the liquid for which the invention is intended is a liquid capable of freezing or solidifying (setting solid) when the temperature reaches a low temperature threshold. These may, for example, be aqueous solutions. One liquid to which the present invention applies particularly well is urea or another reducing agent that can be used in the SCR system of an engine.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid and a less available market (whereas urea is widely used and readily available even in fields such as agriculture). The present invention is particularly advantageous in the context of eutectic water/urea solutions.

According to the invention, the liquid is held in tanks (1) and (2) which may be made from any material, preferably one having good chemical resistance to the liquid in question. In general, this is metal or plastic. Polyolefins, in particular polyethylene (and more particularly HDPE or high-density polyethylene), constitute preferred materials, in particular in the case where the liquid is urea.

These tanks may be produced by any conversion processes known in the case of hollow bodies. One preferred processing method, in particular when the tanks are made of plastic, and in particular HDPE, is the extrusion-blow moulding process. In this case a parison (in one or more parts) is obtained by extrusion, and is then shaped by blow moulding in a mould. One-part moulding of the tank from a single parison gives good results.

The transfer pump to which the invention applies is a pump of any known type, preferably driven by a motor and the operation of which is run by a controller. Preferably, the pump is of the gear pump, turbine pump or diaphragm pump type. The transfer pump is generally controlled to provide a given flow rate and hence, a mere speed controller or a Pulse Width Modulation (PWM) signal generator can be used instead of more sophisticated systems using for instance an ECM (Electronic Control Module).

According to one equally preferred variant, the electronic control module sends an ON/OFF type signal to the pump controller so as to start or stop the operation of the pump.

Advantageously, a feed pump intended for pumping liquid from tank (2) and injecting it for instance in the exhaust gases of the engine, is integrated into a base plate submerged in tank (2). As the transfer pump, the feed pump is a pump of any known type, preferably driven by a motor and the operation of which is run by a controller.

Tank (2) is advantageously equipped with a base plate or mounting plate (i.e. a support having substantially the shape of a plate) onto which at least one active accessory of the urea storage system and/or injection system is attached. This base plate generally has a perimeter, closed up on itself, of any shape. Usually, its perimeter has a circular shape.

In a particularly preferred manner, this base plate is a submerged mounting plate, i.e., that seals an opening in the lower wall of tank (2). The expression "lower wall" is in fact understood to mean the lower half of tank (2) (whether or not it is moulded in one piece or from two parison sheets or cut-outs). Preferably, the base plate is located in the lower third of tank (2), and more particularly preferably, in the lower quarter, or even squarely in the bottom of the tank. It may be partly on the lower side wall, in which case it is slightly slanted once mounted in the vehicle. The location and/or direction of the base plate especially depends on the location of tank (2) in the vehicle, and on the space occupied around it (taking into account the components to be integrated therein).

This base plate therefore incorporates at least one component that is active during storage and/or injection. This is understood to mean that the component is attached to or produced as one part with the base plate. This component may be incorporated inside tank (2), or on the outside with, if necessary, a connection (delivery tube) passing through it.

Preferably, the base plate according to this variant of the invention integrates several active storage and/or metering components and, most particularly preferably, it integrates all the active components which are brought to be in contact with the liquid additive found therein, leaving from or arriving into tank (2).

Preferably, the component is chosen from the following elements: a pump; a filter; a level gauge; a temperature probe; a quality sensor; a pressure sensor and a pressure regulator. It is advantageous for the feed pump to be integrated into such a base plate and for this base plate to also integrate other active components (preferably all the active components) as defined above. According to a preferred embodiment of the invention, tank (1) is not equipped with a heating element, or with a temperature probe or a level gauge. This embodiment is economically very attractive since only tank (2) has to be equipped with such elements.

Hence, preferably, the base plate of tank (2) integrates at least one heating element and most particularly preferably this heating element comprises at least one flexible part (as described in Application FR 07 55118 in the name of the Applicant, the content of which is incorporated by reference in the present application) which is preferably a flexible heater, i.e. a heater comprising one or more resistive track(s) affixed to a film or placed between two films (i.e. two substantially flat supports, the material and thickness of which are such that they are flexible). This film is preferably made of a plastic (although any other insulating material may be suitable) and, in particular, is based on an elastomer. Most particularly preferably, this flexible heater comprises one or more stainless steel resistive track(s) sandwiched between two silicone resin films, one of which is covered with a network of glass fibres.

Preferably, the heating element extends inside tank (2), and is therefore submerged (partially or completely) in the liquid when tank (2) is full. Most particularly preferably, the heating element predominantly consists of a flexible heater. Preferably, there is also a heating element (wire or flexible heater) present around the urea feed line up to the injector and around a return line, where appropriate. Specifically, in one preferred variant of the invention, the pump intentionally meters too great an amount (pressure) of liquid, the excess of which is returned to tank (2), for example using a line equipped with a calibrated valve. When the urea is injected into the exhaust gases of an engine, this variant makes it possible to cool the injector but it should however be noted that the non-return lines are more advantageous, economically speaking.

Preferably, the element for heating the feed and return lines is also a flexible heater.

In this context, the process may be applied to an SCR system for supplying urea to the exhaust gases of an internal combustion engine, of diesel type, such as those that equip motor vehicles and comprise a tank (1) for storing urea and an active tank (2).

Generally, depollution systems like SCR systems are only able to work correctly when given engine conditions are reached for instance: a given rotation speed. Hence, in a preferred embodiment of the invention, the engine speed is controlled before starting any SCR activity.

Therefore, in a preferred embodiment of the invention, when the engine starts, by default, the SCR system and its transfer pump are off and when the target engine rotation speed is reached, the SCR system starts running which includes the function of transferring liquid from tank (1) to tank (2) as described above.

The SCR system generally also comprises a level sensor for the active tank (2), a temperature probe for the active tank (2), a transfer pump intended for pumping the urea solution contained in tank (1) and transferring it into the active tank (2), a pump controller, a temperature probe capable of providing the temperature Text outside the two tanks (1) and (2), a heating element that equips tank (2) and an electronic control module (ECM) that sends a PWM control signal, which has a duty cycle that varies as a function of the operating conditions, to the pump controller.

The present invention may be illustrated in a non-limiting manner by means of scenarios in which the level L in tank (2) is maintained at a level above the target level (for instance a full set point level L2) by virtue of one particular embodiment of the process according to the invention. These scenarios are summarized in Table 1 attached to the present application.

In these scenarios, three situations are differentiated depending on the measured value of the temperature Text outside of the two tanks (1) and (2):

Text is greater than or equal to a set point value T2 (for example 5° C.);

Text is between two set point values T1 (for example −5° C.) and T2 (where T1<T2); and Text is less than or equal to T1.

The three situations are subsequently identified in the following manner: the first situation corresponds to what is referred to as "summer" conditions, the second situation corresponds to what is referred to as "mid-season" conditions and the third situation corresponds to what is referred to as "winter" conditions.

The situations are also differentiated depending on whether they are permanent or transient. The term "permanent" is understood to mean a situation in which the measured value of the temperature Text is between one of the three temperature ranges described above during a given time interval Dt. The term "transient" is understood to mean a situation where successive values of Text measured during the time interval Dt are not all within a single one of the three ranges described above.

A transient situation may, for example, correspond to a mode of driving a motor vehicle equipped with an SCR system according to the invention in mid-season conditions followed by moving into winter conditions or vice versa, which takes place, for example, when the vehicle climbs in altitude, or when a vehicle enters/leaves an underground car park or else when moving from nocturnal temperature conditions to diurnal temperature conditions.

The following scenarios may, for example, be envisaged for permanent situations where the set point level Lsp is L2 as defined above and where there will be overflow (hence: Lsp=L2<Lt=L2+ΔLof):

1. driving the vehicle in summer or mid-season conditions with liquid in tank (1): the level L in tank (2) is measured and it is compared to L2. If L>=L2, nothing happens. If the level L in tank (2) is below L2, the transfer pump is commanded so as to pump liquid in tank (1) and transfer it into tank (2) so that the level Lt can be reached in said tank;
2. driving in summer or mid-season conditions without liquid available in tank (1): the procedure from the preceding scenario is followed. Hence, the level L in tank (2) is measured and is compared to L2. If L is not greater than or equal to L2, the procedure from the preceding scenario is again followed. If, after having restarted the same steps of the process (i.e. measuring L and comparing to L2, then commanding the pump to transfer liquid if L<L2) N times (for example N=3), the level L is still not greater than or equal to Lt=L2+ΔLof, the process provides an indication of the "liquid not available in tank (1)" type;
3. starting in summer or mid-season conditions with liquid in tank (1): see scenario 1;
4. starting in summer or mid-season conditions without liquid available in tank (1): see scenario 2;

5. driving in winter conditions with liquid in tank (1): the process includes a step during the course of which it is verified whether the "winter" situation is permanent. If this is the case, the heating element in tank (2) is activated and liquid is not transferred from tank (1) to tank (2);
6. driving in winter conditions without liquid available in tank (1): see scenario 5;
7. starting in winter conditions with liquid in tank (1): this scenario may correspond to starting after the vehicle has been stopped for a short period. See scenario 5 where the heating element is driven by the value of the temperature T in tank (2);
8. starting in winter conditions without liquid available in tank (1): see scenario 7.

As regards transient situations, the following scenarios are envisaged:
1. driving in mid-season conditions and moving into winter conditions: in this scenario, Text is below T1, the process includes a step in the course of which it is verified whether the "winter" situation exists for a time interval shorter than a time constant that corresponds to the liquid in tank (1) changing from the liquid state to the solid state. If the preceding condition is met and L<L2, the pump is commanded to pump liquid in tank (1) and transfer it to tank (2) so that the liquid in tank (2) reaches a level Lt=L2+ΔLof;
2. driving in winter conditions and moving into mid-season conditions: in this case T1<Text<T2, the process includes a step in the course of which it is verified whether the mid-season situation exists for a time interval longer than a time constant that corresponds to the liquid in tank (1) changing from the solid state to the liquid state. If the preceding condition is met and L<L2, the pump is commanded as in the preceding scenario;
3. driving in summer or mid-season conditions and restarting in winter conditions (e.g. parking for a long period): in this scenario, there is no transfer of liquid from tank (1) to tank (2) if the temperature T in tank (2) is below T1;
4. driving in winter conditions and restarting in summer or mid-season conditions (e.g. parking for a long period): the pump is commanded as in scenario 1.

Figure 2:
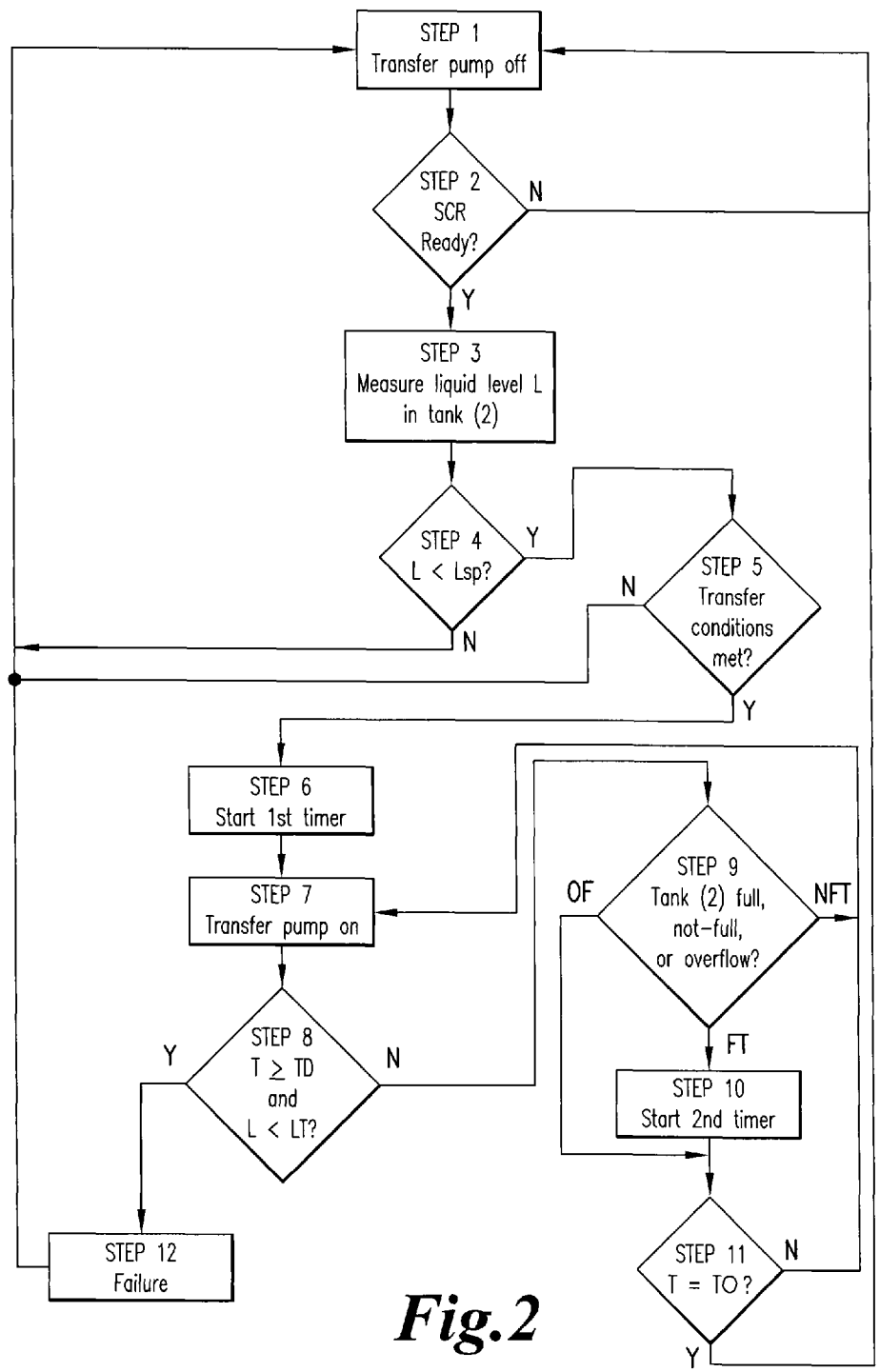
FIG. 2 illustrates a flow chart which may be used by an Electronic Control Module (ECM) for applying a process according to embodiments of the present invention in which liquid is transferred until a given overflow level in the active tank (2) is reached.
Figure 3:
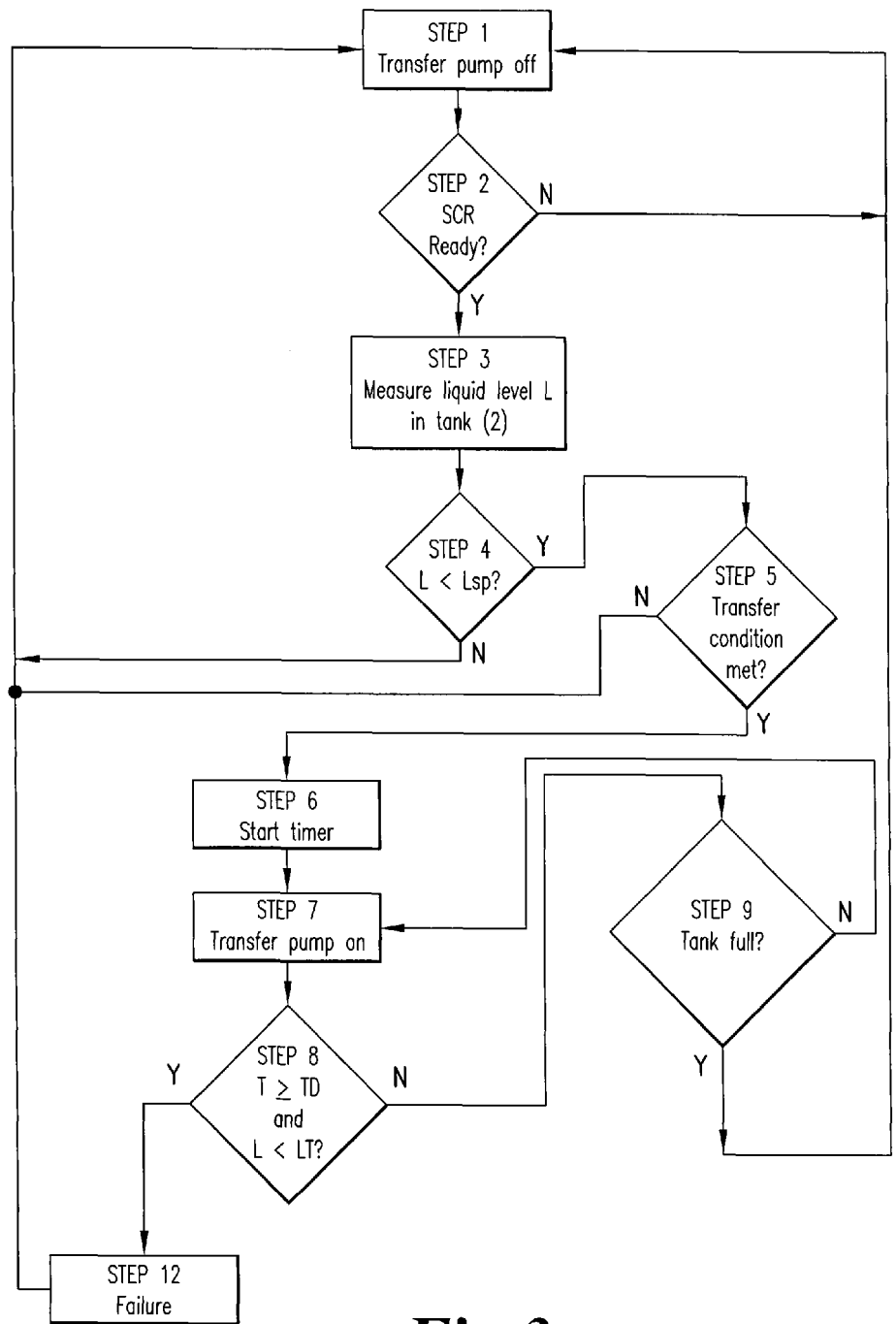
FIG. 3 illustrates a flow chart which is used by the ECM for applying a process according to other embodiments of the present invention in which liquid is transferred until only a full level in the active tank (2) is reached, and is simplified compared to FIG. 2 since there is no overflow situation.

The process according to the invention can also be illustrated, in a non-limiting manner, by appended FIGS. 1, 2 and 3.

The graph from FIG. 1 represents an example of a curve of the liquid level L in tank (2) having a theoretical capacity of 7 liters as a function of the time when there is an overflow of liquid from tank (2) to tank (1) and when there is no transfer of liquid from tank (1) to tank (2). Such a curve can be obtained experimentally using a test bench simulating given driving conditions (generally set by the car manufacturer) and measuring L at different time intervals (t on the x-axis).

Indicated on the y-axis on this graph are several set point values of the liquid level L, in particular a level Lmax corresponding to the maximum capacity of tank (2) (which is 6.5 l and not 7 l because of the location of the overflow connection), a safety set point level Ls (which is about 5.5 l), a full set point level L2 (which is about 4.6 l) and a reserve set point level L1 (which is about 3.5 l), where Lmax>Ls>L2>L1. The curve from FIG. 1 may, for example, be obtained for an SCR system comprising a level sensor capable of providing an indication of the level L in tank (2) in a discrete manner as explained before so that L1 and L2 may have the meanings given before.

In FIG. 1, the curve of the liquid level has two zones that correspond to different values of the overflow flow rate Dd (i.e. in fact the slope of the curve) of liquid from tank (2) to tank (1). The value of the flow rate Dd is higher (for example, around 6 l/h) in a first zone A of the graph where the level L is between the safety level Ls and the maximum level Lmax than in a second zone B of the graph (overflow flow rate of, for example, around 2 l/h) where the liquid level is between the full level L2 and the safety level Ls. After zone 9, there is no overflow anymore and the level in tank 2 will only go down slowly (for instance by 0.2 l/h) because of the liquid consumption by the feed pump.

Listed in the table below are two examples of scenarios that correspond to preferred variants of the process according to the invention.

The first scenario aims at sparing the transfer pump (i.e. not making it transfer a big amount of liquid which will rapidly overflow) while the second scenario aims at providing a maximum liquid volume in tank 2 (in the case it should freeze when restarting the engine the next time). L stands for the level in tank 2 and V1 and V2 are as identified on FIG. 1.

| Conditions | Condition for transferring liquid | Condition for stopping the transfer |
|---|---|---|
| Scenario 1: it is chosen to never operate in zone A of FIG. 1 | | |
| A1. summer | low level: L < L1 or Lsp = L1 | high level reached: L = Lt = L2 |
| A2. mid-season | intermediate or low level: L < L2 or Lsp = L2 | Security level reached: L = Lt = L2 + V1 |
| A3. winter | no transfer | no transfer |
| Scenario 2: it is chosen to operate in zone A only in mid-season | | |
| B1. summer | intermediate or low level: L < L2 or Lsp = L2 | Security level reached: L = Lt = L2 + V1 |
| B2. mid-season | intermediate or low level: L < L2 or Lsp = L2 | Overflow limit reached: L = Lt = L2 + V2 |
| B3. winter | no transfer | no transfer |

According to the above table, the ECM commands the pump to pump liquid in tank (1) and transfer it from tank (1) to tank (2) as a function of the temperature conditions (summer, mid-season, winter), when a transfer condition is met and the ECM commands the pump to stop the transfer when a condition for stopping the transfer is met.

The volumes V1 and V2 correspond to the quantities of liquid that are transferred using the transfer pump from tank (1) to tank (2) so that the level L in tank (2) is above the full set point level L2 with a sufficient margin to avoid activating the pump too frequently when there is an overflow.

FIGS. 2 and 3 consist respectively of flow charts which are used by the ECM for applying a process according to scenarios A2, B1 and B2 (transferring till a given overflow level) and scenario A1 (transferring till full level only) as defined in the table above. In these figures, "Y" stands for "yes" to an answer and "N" for "no".

The process is initiated under a condition where the transfer pump is off (step 1), by detecting that the SCR system is ready to operate (step 2) (for instance when a given engine rotation speed like 500 rpm is reached). The result of this is that the level sensor measures (step 3) the liquid level L in tank (2).

Next, the ECM verifies whether or not the liquid level in tank (2) is below the set point level Lsp (step 4).

If L is not below Lsp, then the process returns to step 1.

On the other hand, if L is below Lsp, step 5 of the process is carried out, where the ECM verifies whether the transfer conditions are met (as explained above).

If they are met, then the process continues to step 6; if they are not met, the process loops back to step 1.

In step 6, the ECM starts a timer that measures the duration of transfer and immediately thereafter, switches the transfer pump on (step 7) so as to draw liquid from tank (1) and transfer it to tank (2).

Once the transfer pump is running, the value of the timer and level L are measured and both are compared respectively to a value of a time constant TD and to the target level Lt (step 8). If the answer to the question "is the timer value more than or equal to TD and is L still below the target level Lt" is positive, the ECM sends out a failure diagnosis (step 12) and the process routes back to step 1 so that the pump is set off.

On the other hand, if the answer to said question is negative, the ECM checks the level L (step 9). There are 3 situations then:

1. L<L2=Lsp so that the tank is not full (NFT); then, the process routes back to step 7

2. L=L2=Lsp so that the tank is full (FT); then, the ECM starts a second timer (step 10) and compares the value of said timer to a time constant TO (step 11). If the value of the timer is not equal to TO (N in step 11), the ECM commands the pump so as to maintain the transfer of liquid from tank (1) to tank (2) (return to step 7). If the value of the timer is at least equal to TO, the ECM orders the stopping of the pump and therefore the transfer of liquid from tank (1) to tank (2) (loop to step 1). The operation of the pump is thus limited to a time period TO that makes it possible to reach a surplus level in tank (2) within the time T0.

3. L>L2=Lsp; the ECM acknowledges the fact that the system is in overflow situation (OF) and that the overflow timer has already been started so that step 10 is bypassed.

Finally, if the system has no failure diagnosis in the meanwhile, when time constant TO is reached (Y in step 11), the system loops to step 1 again and switches the transfer pump off.

FIG. 3 is simplified compared to FIG. 2 since there is no overflow situation so that steps 10 and 11 are no longer required.

Figure 4:
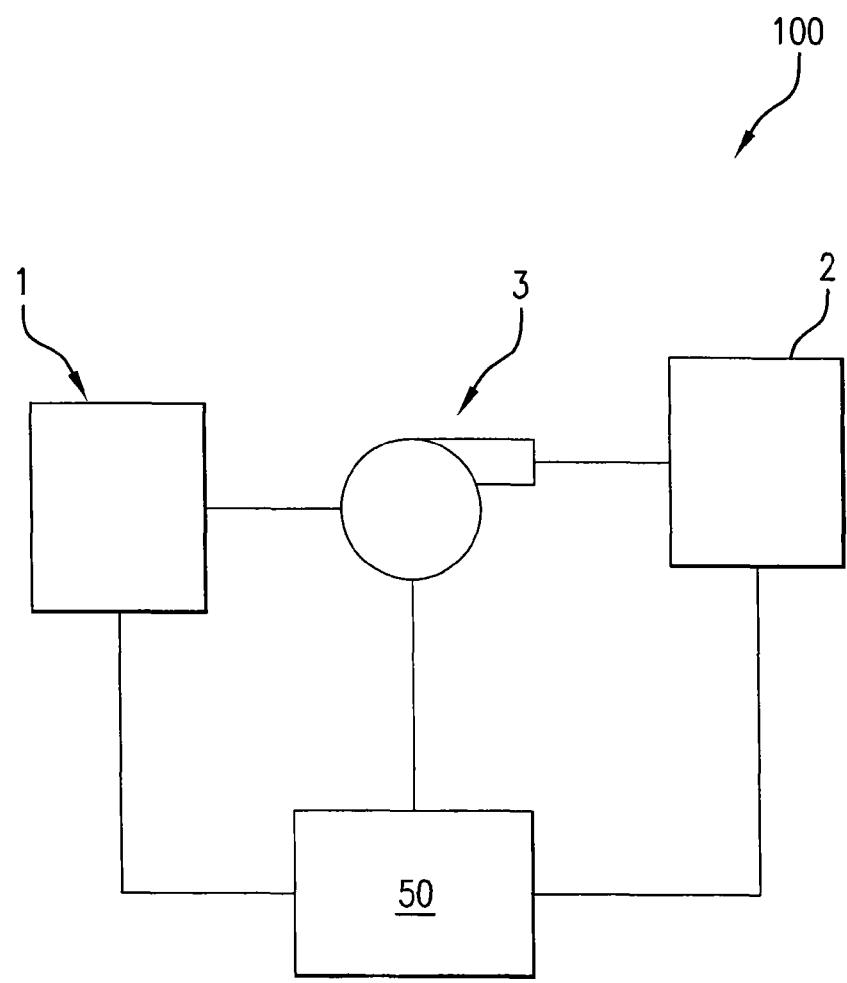
FIG. 4 illustrates a schematic representation an embodiment of the present application.

FIG. 4 schematically illustrates an SCR system 100 in accordance with the present application. The SCR system 100 includes an active tank (1), a passive tank (2), a transfer pump (3), and an ECM (50).

The invention claimed is:

1. A process for transferring liquid from a passive tank for storing the liquid to an active tank, using a transfer pump intended for pumping the liquid held in the passive tank and transferring said liquid to the active tank,
    wherein the pump is commanded so as to transfer the liquid from the passive tank to the active tank when said active tank has a liquid level L below a set point level Lsp and when the passive tank contains liquid at a temperature above a freezing point of the liquid,
    wherein said process comprising:
    measuring a temperature Text outside of the active tank and the passive tank;
    checking whether or not the liquid in the passive tank is frozen using the measured temperature Text, former values of Text, and a time constant that corresponds to the liquid in the passive tank changing from a solid state to a liquid state or vice versa;
    comparing the liquid level L in the active tank to the set point level Lsp;
    activating the transfer pump if the liquid in the passive tank is not frozen and L<Lsp, so as to pump the liquid in the passive tank and transfer the liquid into the active tank until a target level Lt is reached, where Lt>=Lsp, and the transfer pump is stopped; and
    not activating the transfer pump if the liquid in the passive tank is frozen or if L>=Lsp.

2. The process according to claim 1, wherein the active tank is provided with a heating device.

3. The process according to claim 1, wherein
    the liquid level L is measured using a level sensor equipped with a float and positioned in the active tank, if the float is not blocked; and
    the liquid level L is deduced from a value of the liquid level L stored in a memory and from a consumption of the liquid in the active tank, if the float is blocked.

4. The process according to claim 1, wherein a time during which the pump transfers the liquid is measured and the pump is stopped if the time is greater than a time constant TD and the liquid level L has not reached the target level Lt.

5. The process according to claim 1, wherein the active tank comprises a level sensor of a float type which provides three indications of the level L as a function of the relative position of the float with respect to two set point levels L1 and L2, where L1<L2<=Lt:
    when the level L is greater than or equal to L2, the level sensor indicates a high level,
    when the level L is less than L2 and greater than or equal to L1, the level sensor indicates an intermediate level; and
    when the level L is less than L1, the level sensor indicates a low level.

6. The process according to claim 5,
    wherein the passive tank is located below the active tank and is filled by overflow of said active tank, and
    wherein when the level L in the active tank is greater than or equal to L2, the pump is commanded to transfer a quantity of liquid equivalent to an increment ΔLof of the liquid level L that corresponds to an overflow volume in the active tank so that Lt=L2+ΔLof.

7. The process according to claim 6, wherein when the level L in the active tank is greater than or equal to L2, a time for which the pump transfers liquid is measured and the pump is stopped if the time is greater than a time constant TO and the liquid level L is <(Lt=L2+ΔLof).

8. The process according to claim 1, said process being performed by a selective catalytic reduction (SCR) system supplying urea to exhaust gases of an internal combustion engine and comprising said active tank, said passive tank, and said transfer pump, and said process being started only when the engine has reached a given rotation speed.

* * * * *